United States Patent
Sevigny et al.

(10) Patent No.: US 6,945,555 B2
(45) Date of Patent: Sep. 20, 2005

(54) HIDDEN FILAMENT ASSISTED OPENING SYSTEM FOR AN AIRBAG COVER

(75) Inventors: Robert S. Sevigny, Athens, TN (US); Alan R. Deeks, Upminster (GB)

(73) Assignee: Intier Automotive Inc., Newmarket (CA)

( * ) Notice: Subject to any disclaimer, the term of this patent is extended or adjusted under 35 U.S.C. 154(b) by 54 days.

(21) Appl. No.: 10/168,150

(22) PCT Filed: Dec. 13, 2000

(86) PCT No.: PCT/CA00/01470

§ 371 (c)(1),
(2), (4) Date: Nov. 25, 2002

(87) PCT Pub. No.: WO01/44025

PCT Pub. Date: Jun. 21, 2001

(65) Prior Publication Data

US 2003/0141707 A1 Jul. 31, 2003

Related U.S. Application Data

(60) Provisional application No. 60/170,557, filed on Dec. 14, 1999.

(51) Int. Cl.[7] .......................... B60R 21/20; B60R 21/16
(52) U.S. Cl. ..................... 280/728.3; 280/731; 280/732
(58) Field of Search ............................. 280/728.3, 731, 280/732

(56) References Cited

U.S. PATENT DOCUMENTS

| | | | | |
|---|---|---|---|---|
| 4,991,870 A | * | 2/1991 | Beusterien et al. | 280/732 |
| 5,080,393 A | * | 1/1992 | Dixon et al. | 280/732 |
| 5,217,244 A | * | 6/1993 | Bauer | 280/728.3 |
| 5,390,950 A | * | 2/1995 | Barnes et al. | 280/728.3 |
| 5,478,106 A | * | 12/1995 | Bauer et al. | 280/728.3 |
| 5,797,619 A | * | 8/1998 | Bauer et al. | 280/728.3 |
| 5,885,662 A | * | 3/1999 | Gardner, Jr. | 427/426 |
| 6,013,210 A | * | 1/2000 | Gardner, Jr. | 264/40.1 |
| 6,017,617 A | * | 1/2000 | Gardner, Jr. | 428/309.9 |
| 6,210,614 B1 | * | 4/2001 | Gardner et al. | 264/46.5 |
| 6,753,057 B1 | * | 6/2004 | Gardner, Jr. | 280/728.3 |
| 2005/0025937 A1 | * | 2/2005 | Maki et al. | 428/172 |

FOREIGN PATENT DOCUMENTS

| | | | | |
|---|---|---|---|---|
| DE | 40 29 940 A1 | 3/1992 | | |
| EP | 0595374 A1 | * | 5/1994 | B60R/21/20 |
| EP | 0639481 A1 | * | 2/1995 | B60R/21/20 |
| EP | 0 780 587 A1 | 6/1997 | | |

* cited by examiner

*Primary Examiner*—Paul N. Dickson
*Assistant Examiner*—Joselynn Y. Sliteris
(74) *Attorney, Agent, or Firm*—Honigman Miller Schwartz and Cohn LLP

(57) ABSTRACT

A hidden air bag assist includes a skin (12) having inner and outer sides. A liquid contaminant (14) is disposed within the skin (12) such that the contaminant (14) is not visible through the outer side. The contaminant (14) creates a weakened area or frangible line within the skin and defines a passageway for allowing an airbag to deploy therethrough.

7 Claims, 2 Drawing Sheets

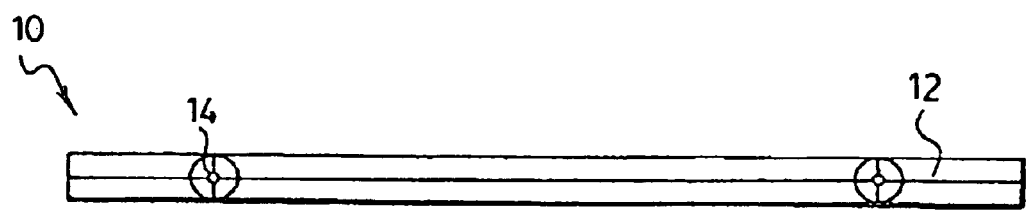
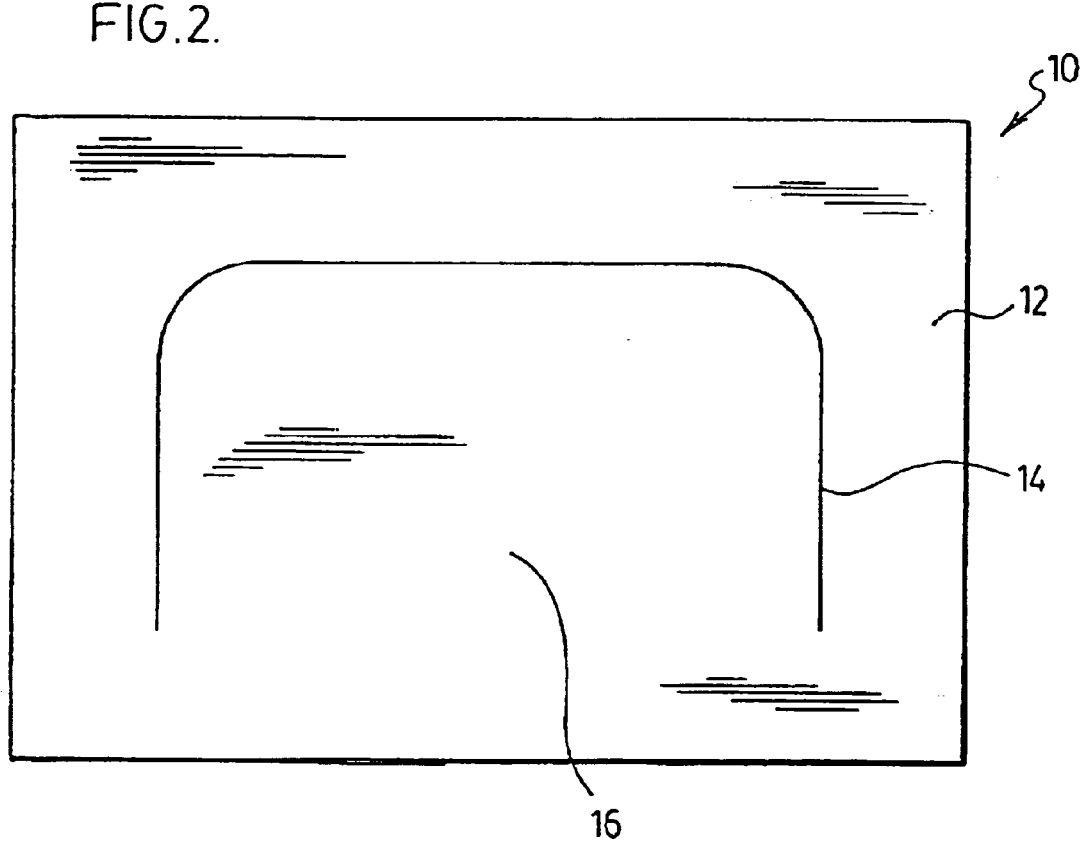

HIDDEN FILAMENT ASSISTED OPENING SYSTEM FOR AN AIRBAG COVER

This application claims the benefit of U.S. Provisional Application No. 60/170,557, filed Dec. 14, 1999.

FIELD OF THE INVENTION

The subject invention relates to an interior panel cover for concealing an airbag module.

BACKGROUND OF THE INVENTION

Traditionally, air bags installed in a vehicle interior are concealed from the view of a passenger by panels or covers. These panels or covers are designed to conceal the air bag during normal vehicle operation, but still allow the air bag to inflate into the passenger compartment with little restriction in an emergency situation.

One method of concealing the air bag and still allow for uninhibited air bag inflation is to cover the air bag system with a textured skin designed to tear or break away during air bag deployment. The skin appears complete and intact to a passenger, but contains hidden weak points that tear under the trauma of an air bag deployment. Current methods to create a weakened area in the textured skin include the use of secondary stamping, perforating or cutting operations which are costly and sometimes inaccurate. The subject invention improves on these methods by utilizing an encapsulated filament or contaminant to create weakened points within the textured skin.

SUMMARY OF THE INVENTION

The disadvantages of the prior art may be overcome by providing a hidden air bag assist system that covers an interior automotive panel. The system includes a skin having inner and outer sides. A liquid contaminant or a filament is disposed within the skin such that the contaminant or filament is not visible through the outer side. The contaminant or filament creates a weakened area within the skin and defines a passageway for allowing an air bag to deploy therethrough.

BRIEF DESCRIPTION OF THE DRAWINGS

Advantages of the present invention will be readily appreciated as the same becomes better understood by reference to the following detailed description when considered in connection with the accompanying drawings wherein:

FIG. 1 is a side view of a filament imbedded in the textured skin;

FIG. 2 is a planer view showing the filament imbedded in the textured skin;

DETAILED DESCRIPTION OF THE PREFERRED EMBODIMENT

Figure 3:
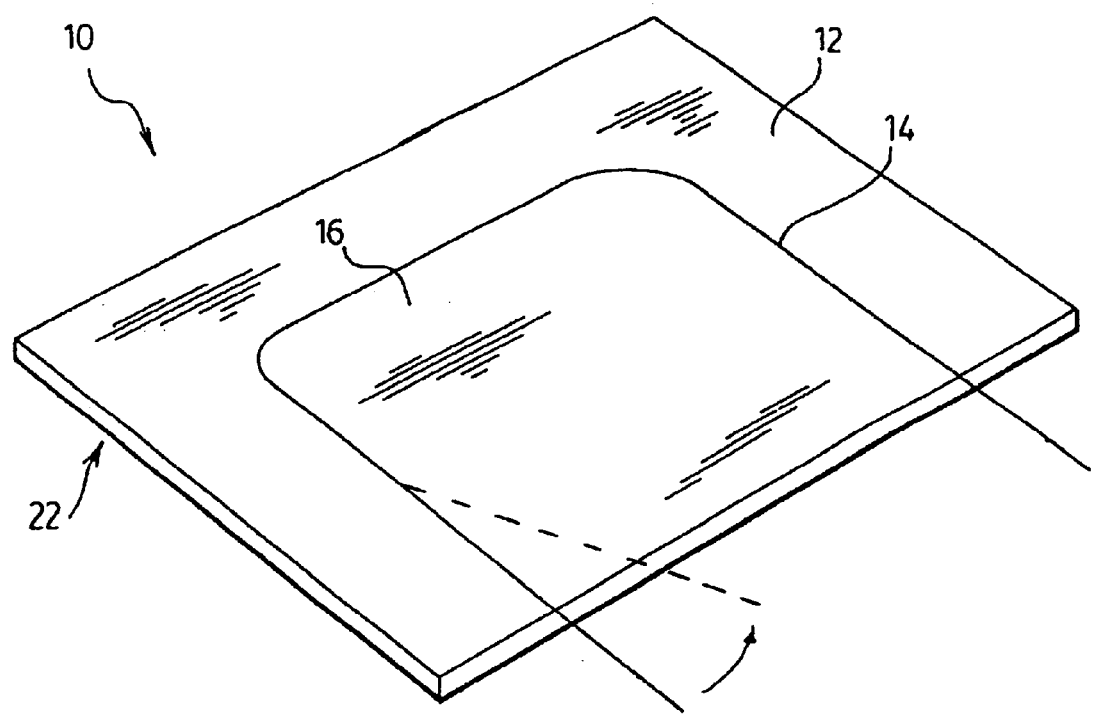
FIG. 3 perspective view of the alternate embodiment with the filament ends extending outward from the textured skin.

Referring to the Figures wherein like numerals indicate like or corresponding parts throughout the several views, a hidden air bag assist system is generally shown at 10. The hidden air bag assist system 10 includes a skin 12 formed from sprayed two part polyurethane utilizing a water-dispersed polyurethane in-mold coating, as described in U.S. Pat. Nos. 5,885,662; 6,013,210; 6,017,617 with an encapsulated contaminant 14. Preferably, the in-mold coating is an aliphatic thermoplastic polyurethane and the two part polyurethane is aromatic.

The skin 12 is designed to cover a vehicle interior panel, such as an instrument panel or a door panel, thereby concealing an air bag module. As appreciated, air bag modules typically include an air bag and an air bag canister. The encapsulated contaminant 14 is not visible through the outer surface of the skin 12 to passengers seated within the vehicle. In other words, during normal operating conditions, the air bag module is concealed behind the skin covered interior panel. The encapsulated contaminant 14 defines a passageway 16 through which the air bag deploys.

In the preferred embodiment of the present invention, the contaminant 14 is a liquid. Alternatively, contaminant 14 could be in the form of a gel or paste. The liquid contaminant 14 may comprise any liquid which once cured is compatible with the polyurethane skin 12. Generally the type of liquid contaminant 14 is limited only to liquids that will not deteriorate or destroy the polyurethane skin 12 during fabrication or after the skin 12 is formed. Additionally, the liquid 14 must have a viscosity that prevents the liquid from flowing across the face of the skin 12 in an uncontrolled manner during deposit. The liquid contaminant 14 may form an adhesive bond with the polyurethane skin 12 but inhibits any cross linking between layers of polyurethane skin 12.

A bead of liquid contaminant 14 is deposited during molding of the skin 12. Specifically, the liquid contaminant 14 is applied in the outline of a desired or predetermined pattern on a first layer of the sprayed polyurethane skin 12, comprising an in-mold coating and a polyurethane layer. Subsequent layers of the polyurethane skin 12 are applied over the initial first layer and the liquid contaminant 14. Once the liquid contaminant 14 cures to a solid or semi-solid state, it creates a specific localized area of two or more thin layers instead of one thick layer. Multiple thin layers tear or rip easier than one thick layer allowing the air bag to pass through the outlined passageway 16. Thus, the contaminant 14 defines a frangible line for airbag deployment.

In addition, the liquid contaminant may be formed of a polyurethane which is similar to the polyurethane used to create the polyurethane skin 12. The polyurethane contaminant 14 must form a weakened bond with the polyurethane skin 12 than the bond between the layers of the polyurethane skin 12 itself.

The use of a liquid contaminant 14 that cures to a flexible solid or semi-solid state and forms an adhesive or relatively weaker bond (urethane liquid contaminant) with the polyurethane skin 12 provides some specific advantages over the use of a non-bonding contaminant. The bonding liquid contaminant would improve the visual appearance and durability of the skin by making any passageway 16 invisible to a passenger. The non-bonding liquid contaminant 14 may cause a depression or visible outline of the passageway 16 after prolonged exposure to the environment. Further, the non-bonding liquid contaminant 14 may age differently than the surrounding polyurethane skin 12, possibly causing the outline of the passageway 16 to become visible over time.

Encapsulation of either the liquid contaminant 14 within the polyurethane skin 12 is preferably accomplished during the spray polyurethane forming process. A mold (not shown) having a textured surface is used to form the skin 12 with the encapsulated liquid or filament contaminant 14. The textured surface of the mold creates the look and feel desired of the outer side 22 of the skin 12. The polyurethane is sprayed in a sweeping motion across the mold to form an initial layer.

The contaminant is then deposited on the initial layer. As appreciated, methods currently known in the art may be utilized to apply the liquid contaminant 14 to the sprayed polyurethane skin 12. The method will vary dependent only upon manufacturing necessities and individual customer requirements. The means of placing the contaminant 14 within the sprayed polyurethane skin 12 could include robotic methods that can dispense a liquid contaminant 14 in a specified pattern, which are commonly used for hidden air bag covers.

A second layer of sprayed polyurethane is then applied to encapsulate the contaminant 14. Once the skin 12 has been allowed to cure, the skin 12 is then de-molded for further processing. The loose ends of the contaminant 14 can be trimmed or held in a manner which does not interfere with subsequent processing or the deployment of the airbag.

In a second embodiment of the invention, the liquid contaminant is cured to a solid or flexible state prior to the application to the initial layer of the polyurethane skin 12. The liquid contaminant 14 becomes a filament which is applied to the skin 12. Preferred materials include organic polymeric materials, including nylon, polypropylene, and polyethylene. A fixture is required to retain the filament in place and tensioned during the application of the second layer. The fixture also ensures that the filament 14 is properly positioned within the skin 12.

In a third embodiment of the invention, the skin 12 with an encapsulated contaminant 14 is formed as described above. However, prior to subsequent processing, the contaminant 14 is removed to form either two unattached layers of the skin 12 along the predetermined line or a single layer with the inner layer of the skin 12 ripped along the frangible line, leaving the outer layer to conceal the frangible line.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that the invention may be practiced otherwise than as specifically described.

What is claimed is:

1. A method of manufacturing a hidden air bag assist system for covering interior automotive panels, said method including the steps of:

applying a first layer of urethane on a mold surface of a mold;

applying a liquid filament in a predetermined pattern over the first layer of urethane;

applying a second layer of urethane over the liquid filament and the first layer of urethane; and curing the liquid filament between the first and second layers of urethane to form a skin wherein the filament creates a weakened area within the skin and defines a passageway by allowing an air bag to deploy therethrough.

2. A method as set forth in claim 1 further including the step of spraying the layers of urethane on the mold surface of the mold.

3. A method as set forth in claim 2 further including the step of spraying the liquid filament in a predetermined pattern on the first layer of urethane.

4. A method as set forth in claim 3 further including the step of adhesively bonding the liquid filament between the layers of urethane.

5. A method as set forth in claim 4 further including the step of removing the liquid filament from between the layers of urethane to create a weakened area within the skin.

6. A method of manufacturing a hidden air bag assist system for covering interior automotive panels, said method including the steps of:

applying a first layer of urethane on a mold surface of a mold;

applying a filament in a predetermined pattern over the first layer of urethane;

encapsulating the filament between the first layer and a second layer of urethane to form a skin wherein the filament defines a passageway for allowing an air bag to deploy therethrough; and removing the filament from between the first and second layers of urethane to create a weakened area within the skin.

7. A method as set forth in claim 6 further including the step of spraying the layers of urethane on the mold surface of the mold.

* * * * *